United States Patent
Chellan et al.

(10) Patent No.: US 9,303,549 B2
(45) Date of Patent: Apr. 5, 2016

(54) ENGINE COOLING SYSTEM AND METHOD FOR AN ENGINE

(71) Applicant: General Electric Company, Schenectady, NY (US)

(72) Inventors: Gokulnath Chellan, Bangalore (IN); Gregory Alan Marsh, Erie, PA (US); Hemant Patni, Bangalore (IN)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 14/066,166

(22) Filed: Oct. 29, 2013

(65) Prior Publication Data

US 2014/0123917 A1 May 8, 2014

Related U.S. Application Data

(60) Provisional application No. 61/721,743, filed on Nov. 2, 2012.

(51) Int. Cl.
| | |
|---|---|
| *F01P 7/02* | (2006.01) |
| *F01P 7/16* | (2006.01) |
| *F01P 7/10* | (2006.01) |
| *B60K 11/08* | (2006.01) |
| *F01P 7/12* | (2006.01) |
| *F01P 11/10* | (2006.01) |
| *F01P 7/14* | (2006.01) |

(52) U.S. Cl.
CPC . *F01P 7/164* (2013.01); *F01P 7/10* (2013.01); *B60K 11/085* (2013.01); *F01P 7/02* (2013.01); *F01P 7/12* (2013.01); *F01P 11/10* (2013.01); *F01P 2007/143* (2013.01); *Y02T 10/146* (2013.01)

(58) Field of Classification Search
CPC .............. F01P 7/12; F01P 7/10; F01P 7/02; F01P 11/10; B60K 11/085
USPC ...................................... 123/41.04
See application file for complete search history.

(56) References Cited

U.S. PATENT DOCUMENTS

| | | | |
|---|---|---|---|
| 3,863,612 A | 2/1975 | Wiener | |
| 5,415,147 A | 5/1995 | Nagle et al. | |
| 5,566,745 A | 10/1996 | Hill et al. | |
| 5,669,311 A | 9/1997 | Hill et al. | |
| 5,868,105 A * | 2/1999 | Evans | 123/41.5 |
| 6,098,576 A | 8/2000 | Nowak, Jr. et al. | |
| 6,196,167 B1 | 3/2001 | Marsh et al. | |
| 6,227,153 B1 | 5/2001 | Till | |
| 6,230,668 B1 | 5/2001 | Marsh et al. | |
| 6,283,100 B1 | 9/2001 | Chen et al. | |
| 6,286,311 B1 | 9/2001 | Chen | |
| 6,325,050 B1 | 12/2001 | Gallagher et al. | |
| 6,394,044 B1 | 5/2002 | Bedapudi et al. | |
| 6,604,515 B2 | 8/2003 | Marsh et al. | |
| 2002/0195090 A1* | 12/2002 | Marsh et al. | 123/563 |
| 2011/0132291 A1* | 6/2011 | Ulrey et al. | 123/41.1 |
| 2011/0137530 A1* | 6/2011 | Kerns | 701/49 |

* cited by examiner

*Primary Examiner* — Lindsay Low
*Assistant Examiner* — Charles Brauch
(74) *Attorney, Agent, or Firm* — GE Global Patent Operation

(57) ABSTRACT

Various embodiments for a thermal management system are provided. In one example, a thermal management system includes a coolant pump that provides coolant to a first cooling circuit and a second cooling circuit in parallel. The first cooling circuit includes an air-to-coolant radiator system and the second cooling circuit includes an engine coolant jacket. The thermal management system further comprises a fan and a cooling shutter for controlling a flow of air through the air-to-coolant radiator system.

20 Claims, 2 Drawing Sheets

ENGINE COOLING SYSTEM AND METHOD FOR AN ENGINE

CROSS-REFERENCE TO RELATED APPLICATIONS

This application claims priority to U.S. Provisional Application No. 61/721,743, filed Nov. 2, 2012, which is hereby incorporated by reference herein in its entirety.

FIELD

Embodiments of the subject matter disclosed herein relate to an engine cooling system.

BACKGROUND

To reduce overheating on an engine and related components, a cooling system may route coolant through a single cooling circuit that includes the engine and a radiator or other heat exchanger. The temperature of the engine may be regulated in part by adjusting the speed of one or more cooling system fans to adjust an amount of cooling of the coolant within the single cooling circuit. However, the temperature of coolant provided to the engine in a single circuit system may be too cool to maintain a designated operating temperature of the engine. Further, the temperature of coolant provided to other heat exchangers in the single circuit may be too warm to maintain a designated operating temperature for respective elements of the cooling system that are cooled by the other heat exchangers.

BRIEF DESCRIPTION

In one embodiment, a system comprises a coolant pump providing coolant to a first cooling circuit and a second cooling circuit, the first cooling circuit including an air-to-coolant radiator system and the second cooling circuit including an engine coolant jacket. In this way, one embodiment may utilize a single pump to provide coolant of varying temperatures to different devices so that the actual coolant temperature better tracks a designated value for a given device. In particular, coolant provided to an engine coolant jacket may be maintained at a higher temperature than coolant provided to a radiator system and other heat exchange elements. Orifices may be utilized to control flow throughout the system and a fan and shutter may be adjusted to control air flow through the radiator system. The combination of these elements allows a designated temperature or temperature range to be maintained throughout the system while providing a smaller radiator system, simplified assembly and maintenance, greater engine reliability, and increased cost effectiveness in comparison to single circuit cooling systems.

In an embodiment, a thermal management system comprises a coolant pump, a first cooling circuit including an air-to-coolant radiator system, and a second cooling circuit including an engine coolant jacket. The engine coolant jacket surrounds a plurality of cylinders of an engine. The coolant pump is configured to provide coolant to the first cooling circuit and the second cooling circuit in parallel. The air-to-coolant radiator system of the first cooling circuit is configured to cool coolant from the coolant pump. The system further comprises a fan operable to provide air flow to the air-to-coolant radiator system, and a cooling shutter, positioned on another side of the air-to-coolant radiator system and remote from the fan, and being adjustable to control the air flow through the air-to-coolant radiator system.

In another embodiment, a thermal management system comprises a coolant pump, a fan, and a cooling shutter. The coolant pump is configured to provide coolant to a first cooling circuit by directing coolant from an outlet of the coolant pump to an air-to-coolant radiator system, to a water-based intercooler, to an oil cooler, and then to an inlet of the coolant pump. The coolant pump is further configured to provide coolant to a second cooling circuit by directing coolant from the outlet of the coolant pump to an engine coolant jacket surrounding a plurality of cylinders of an engine and then to the inlet of the coolant pump. The fan is operable to provide air flow to the air-to-coolant radiator system. The cooling shutter, positioned on an opposite side of the air-to-coolant radiator system from the fan, is adjustable to control the air flow through the air-to-coolant radiator system.

Another embodiment relates to a thermal management method. The method comprises pumping coolant from a coolant pump of an engine to two or more cooling circuits in parallel, one of the cooling circuits including an air-to-coolant radiator system and another of the cooling circuits including an engine coolant jacket surrounding a plurality of cylinders of the engine. The method further comprises detecting one or more operating parameters of the engine, and adjusting a fan to adjust air flow provided by the fan to the air-to-coolant radiator system. The air flow is adjusted based on one or more detected operating parameters. The method further comprises adjusting a cooling shutter to adjust air flow provided to the air-to-coolant radiator system based on one or more detected operating parameters.

It should be understood that the brief description above is provided to introduce in simplified form a selection of concepts that are further described in the detailed description. It is not meant to identify key or essential features of the subject matter.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of an engine cooling system. The engine cooling system may include multiple cooling circuits to provide coolant of different temperatures in parallel to elements of the engine cooling system. The engine cooling system may also include a variable speed fan configured to cool coolant or air and a cooling shutter configured to adjust an amount of air flow that passes through an element such as an air-to-coolant radiator. The fan and the shutter may be regulated by a controller to maintain designated engine temperature. In some embodiments, the fan and shutter may be regulated to maintain a designated temperature and/or temperature range for various elements of the system, such as an engine water temperature, a manifold air temperature, and/or a lube oil temperature. In one example, coolant may be pumped to a first cooling circuit including an engine coolant jacket and a second cooling circuit including an air-to-coolant radiator system in parallel in order to maintain engine temperature at a designated temperature. ("Designated" temperature refers to a target temperature which is sought to be achieved and maintained at least under certain conditions and/or in certain operating modes.)

Figure 1:
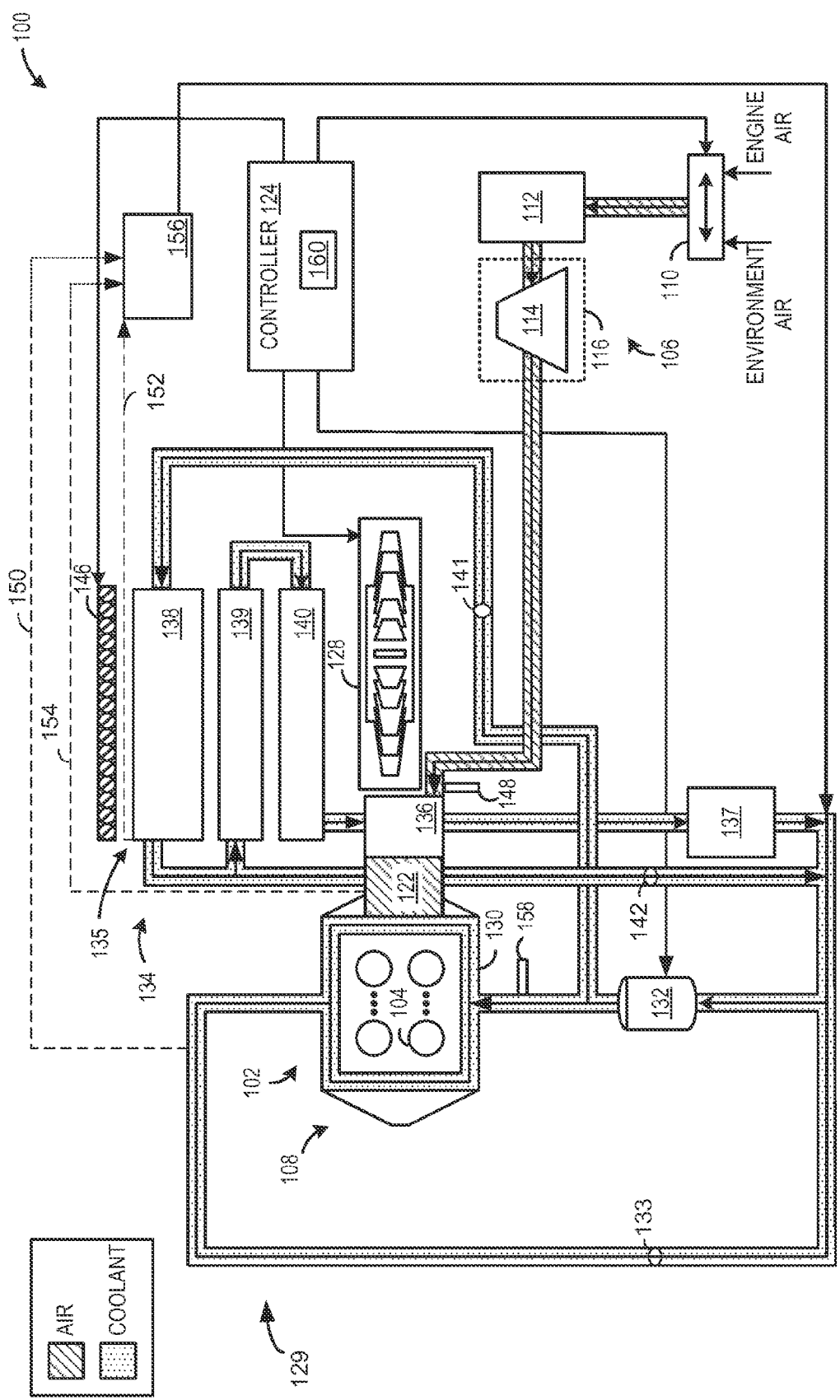
FIG. 1 schematically shows an engine and cooling system according to an embodiment of the present invention.

FIG. 1 shows an embodiment of a thermal management system 100 that is operable to control temperatures of fluids and components of an internal combustion engine 102. The engine 102 includes a plurality of cylinders 104, an air intake structure 106, and an exhaust structure 108. In some implementations, the thermal management system 100 and the engine 102 are coupled to a vehicle. For example, the vehicle may be a locomotive, marine vessel, mining haul truck, other mining equipment, such as an off-highway vehicle (OHV), and/or yet other vehicles with the thermal management system being modified or adapted for the particular implementation. In some embodiments, the thermal management system 100 and the engine 102 are stationary, such as when incorporated into a power plant or generator. In some implementations, the engine 102 is a diesel engine.

The air intake structure 106 couples to the plurality of cylinders 104 and defines an air intake passage therethrough. Intake air (a.k.a. intake air charge, combustion air, etc.) is delivered to the plurality of cylinders 104 through the air intake passage for combustion. A plurality of thermal management components are positioned in the intake passage to control the temperature and pressure of intake air flowing through the passage. The illustrated implementation includes an air intake door 110, an air filter 112, a compressor 114 of a turbocharger 116, a water-based intercooler 136, and an air-to-air intercooler 122 positioned in the air passage of the air intake structure 106. An air intake door, such as the air intake door 110, may be absent in some embodiments.

As illustrated in FIG. 1, the air intake door 110 is coupled to the air intake structure 106. The air intake door 110 is operable to vary combustion intake air temperatures based on operating conditions. In particular, the air intake door 110 may be adjustable to at least a first position that connects the air intake passage with an engine compartment to provide intake air from the engine compartment to the air intake passage. Furthermore, the air intake door 110 may be adjustable to a second position that connects the air intake passage with environment outside of the engine compartment to provide ambient environment air to the air intake passage. By adjusting the air intake door 110 to the first position to provide intake air from the engine compartment, combustion intake air temperature may be increased. By adjusting the air intake door 110 to the second position to provide intake air from the ambient environment, combustion intake air temperature may be decreased.

In some implementations, the air intake door 110 is manually adjustable between at least the first position and the second position. In some implementations, the air intake door 110 is automatically adjustable between at least the first position and the second position. In particular, a controller 124 is configured to adjust the air intake door 110 between the first position and the second position based on an operating parameter. For example, the controller 124 may be configured to adjust the air intake door 110 based on intake air temperature. As a particular example, during an engine startup condition, the air intake door 110 is adjusted to the first position to supply warmer intake air from the engine compartment to heat the engine 102. Correspondingly, once the engine has been suitably heated, the air intake door 110 is adjusted to the second position to provide cooler ambient intake air for combustion. As another example, the controller may be configured to adjust the air intake door 110 based on ambient environment temperature. As a particular example, during winter conditions where ambient environment temperature is low, the air intake door 110 is adjusted to the first position to increase engine combustion air intake temperature. The increased intake air temperature reduces the combustion intake air charge density and reduces the combustion pressure on the engine cylinders, which may be more prone to degradation in low temperature. Furthermore, the increased intake air temperature aids in melting any ice or snow that is present in the intake air passage.

The air filter 112 is positioned in the air intake passage defined by the air intake structure 106 downstream from the air intake door 110. The air filter 112 prevents abrasive particulate matter from entering the plurality of cylinders 104 and maintains clean combustion air for the engine 102.

The turbocharger 116 includes the compressor 114 which is positioned in the air intake passage defined by the air intake structure 106, and a turbine (not shown) which is positioned in an exhaust passage that is coupled to the engine 102. The turbine is coupled to the compressor 114 so that the compressor is driven by exhaust gas that spins the turbine. The compressor 114 increases the pressure of combustion air that flows from the air filter 112. The pressure increase of combustion air by the compressor 114 increases charge density of combustion air entering the plurality of cylinders 104. Moreover, increasing the pressure of the combustion air also increases a temperature of the combustion air.

In some embodiments, an air-to-air intercooler 122 is positioned downstream from the compressor 114 and the water-based intercooler 136 in the air intake passage defined by the air intake structure 106. Air-to-air intercooler 122 provides heat rejection to the combustion air. The air-to-air intercooler 122 includes interior fins that, depending on implementation, differ in fin type, fin density, or both fin type and fin density as a function of the location of the interior fins relative to the interior of the air-to-air intercooler 122. The differing interior fin type and/or density aid in forming a combustion air path through the air-to-air intercooler 122 that distributes or balances the combustion air through the interior by a determined amount. Heat is directly rejected from combustion air through the interior fins to the atmosphere. Furthermore, the air-to-air intercooler 122 includes exterior fins that, depending on implementation, differ in fin type, fin density, or both fin type and fin density as a function of the location of the exterior fins relative to the exterior of the air-to-air intercooler 122. The differing exterior fin type and/or density aid in distributing air flow across the air-to-air intercooler 122 so that air flows across a greater portion of the surface area of the air-to-air intercooler 122 to increase heat rejection capabilities. In some embodiments, air flow may be provided to the air-to-air intercooler 122 via one or more adjustable fans. Air-to-air intercooler 122, when included, may provide further cooling to combustion air that passes through water-based intercooler 136.

Continuing with FIG. 1, thermal management of the engine 102 is further controlled by pumping coolant through two or more cooling circuits, such as a first and second cooling circuit, in parallel. For example, a first portion of coolant may be pumped through the first cooling circuit without entering the second cooling circuit and/or without passing through one or more elements of the second cooling circuit. Likewise, a second portion of coolant may be pumped through the second cooling circuit without entering the first cooling circuit and/or without passing through one or more elements of the first cooling circuit. Further, in some embodiments, the first and second portions of coolant may be pumped substantially simultaneously through the first and second cooling circuits, respectively. The first and second cooling circuits provide separate paths for coolant to flow, thereby allowing more control over coolant temperatures within each circuit in comparison to single circuit cooling systems. In particular, coolant provided to the engine 102 is maintained at a higher temperature when the coolant flowing through an engine cooling circuit 129 is not directly cooled by a radiator. In the engine cooling circuit 129, a coolant pump 132 pumps coolant to an engine coolant jacket, such as water jacket 130. In some implementations, the coolant pump 132 is a single rotor engine-driven coolant pump.

The water jacket 130 is formed in an engine block surrounding the plurality of cylinders 104. Heat is rejected from the plurality of cylinders 104 through cylinder walls to engine coolant flowing through the water jacket 130. The heated engine coolant flows from the water jacket 130 back to the coolant pump 132 through orifice 133. Orifice 133 is therefore positioned between an outlet of the engine coolant jacket and an inlet of the coolant pump in order to passively control a flow of coolant directed back to coolant pump 132. For example, an orifice may act as a flow restrictor by having an opening with a smaller diameter than that of a coolant flow pipe in which it is situated. Accordingly, coolant flow may be restricted and controlled by the size of the opening in the orifice. In some implementations, orifice 133 may additionally or alternatively actively control the amount of coolant directed back to coolant pump 132 via a moveable obstruction, such as a valve.

Thermal management of the engine 102 is further controlled by a radiator cooling circuit 134. For example, coolant is directed from the coolant pump 132 to the radiator cooling circuit 134 in parallel to the engine cooling circuit 129. In other words, coolant exiting the coolant pump 132 may be directed through a diverter section, connected to an output of the coolant pump 132, which passively splits the coolant to direct a first portion of the coolant through the radiator cooling circuit 134 and a second portion of the coolant through the engine cooling circuit 129. In some embodiments, the first portion may include an equal amount of coolant as the second portion such that the diverter is configured to direct a substantially equivalent amount of coolant to both cooling circuits. For example, a first half of the coolant pumped by the coolant pump 132 may be directed to the engine cooling circuit 129 and a second half of the coolant pumped by the coolant pump 132 may be directed to the radiator cooling circuit 134.

The radiator cooling circuit 134 may include various elements, such as an air-to-coolant radiator system 135, water-based intercooler 136, and/or oil cooler 137. In some embodiments, one or more of the various elements may be arranged in series and/or parallel. For example, as illustrated in FIG. 1, elements of the radiator cooling circuit 134 are arranged in series, such that coolant flows directly from one element to another sequentially. The air-to-coolant radiator may include an air-to-coolant radiator unit 138, which is in fluidic communication with a first air-to-coolant sub-cooler 139, which is in fluidic communication with a second air-to-coolant sub-cooler 140. In some embodiments, a third air-to-coolant sub-cooler may be in fluidic communication with the first and second air-to-coolant sub-coolers such that coolant flows from the first air-to-coolant sub-cooler 139 to the third air-to-coolant sub-cooler and from the third air-to-coolant sub-cooler to the second air-to-coolant sub-cooler 140. The water-based intercooler 136 is mounted to engine 102 upstream of air-to-air intercooler 122 and in fluidic communication with the second sub-cooler 140. The coolant-to-oil cooler 137 is in fluidic communication with the water-based intercooler 136.

In the illustrated implementation, coolant is pumped from the coolant pump 132 through orifice 141 to radiator unit 138. Orifice 141 is therefore positioned between an outlet of the coolant pump and an inlet of the radiator unit 138 in order to passively control a flow of coolant directed to the radiator unit 138. In some implementations, orifice 141 may additionally or alternatively actively control the amount of coolant provided to the radiator unit 138 via a moveable obstruction, such as a valve.

Continuing with the radiator cooling circuit 134, coolant circulates through various tubes of the radiator unit 138. Heat from the coolant is transferred to fins that are positioned between the tubes. The fins radiate the heat transferred from the tubes to the atmosphere. Coolant flows from the radiator unit 138 to the first sub-cooler 139 to further cool the coolant, and then flows to the second sub-cooler 140. The first and second sub-coolers 139 and 140 create sub-cooled coolant by using slower coolant flow for more exposure to the radiator fins. Coolant also flows from the radiator unit 138 to the coolant pump 132. As illustrated, coolant exiting the radiator unit 138 is split to provide coolant to first sub-cooler 139 and to coolant pump 132. For example, coolant may flow through a passive piping flow split tee or other split passageway attached to an outlet of the radiator. The split passageway may be positioned between the radiator unit 138 and the first sub-cooler 139 and configured to split coolant exiting the radiator into a first portion of coolant provided to the coolant pump 132 and a second portion of coolant provided to the first sub-cooler 139. Coolant that is directed from the radiator unit 138 to the coolant pump 132 may pass through orifice 142 to control an amount of coolant that is directed to the coolant pump 132. Orifice 142 is therefore positioned between an outlet of the radiator unit 138 and an inlet of the coolant pump 132 in order to passively control a flow of coolant directed to the coolant pump 132. In some implementations, orifice 142 may additionally or alternatively actively control the amount of coolant provided to the radiator unit 138 via a moveable obstruction, such as a valve.

In embodiments, a fan 128 is operable to provide air flow to the air-to-coolant radiator system 135. For example, the air flow from the fan 128 may pass through the second sub-cooler 140 to the first sub-cooler 139, and through the first sub-cooler 139 to the radiator unit 138. The fan 128 may be mechanically driven by a drive shaft of the system. In some embodiments, operation of the fan 128 is adjustable by the controller 124 based on different operating conditions. The controller 124 may be configured to control the fan 128 in response to one or more operating conditions and/or parameters of the engine that are detected or sensed via one or more sensors of the engine. For example, the controller 124 may be operable to adjust a speed of the fan 128 to adjust air flow provided by the fan. As another example, the controller 124 may be operable to adjust a fan blade pitch of the fan 128 to adjust air flow provided by the fan.

A cooling shutter 146 is positioned on the opposite side of the air-to-coolant radiator system 135 and remote from the fan 128. The cooling shutter 146 may be remote from the fan 128 by being spatially separated from the fan with one or more intervening elements. For example, as illustrated in FIG. 1, the radiator unit 138, the first sub-cooler 139, and the second sub-cooler 140 are positioned between the cooling shutter 146 and the fan 128. The cooling shutter 146 is adjustable to adjust air flow provided to the radiator. For example, the cooling shutter 146 can be closed to obstruct air flow provided by the fan 128 from flowing past the air-to-coolant radiator system 135, thereby reducing an amount of air flow provided to one or more elements of the air-to-coolant radiator system 135. Furthermore, the cooling shutter 146 provides natural convection heat exchanger loss reduction when closed.

On the other hand, the cooling shutter 146 can be opened to allow air flow provided by the fan 128 to flow past the radiator system 135. In some embodiments, a degree of opening of the cooling shutter 146 can be variably adjusted to different positions between fully opened and closed to throttle air flow to allow a designated amount of air to reach the air-to-coolant radiator. Such cooling shutter control may be implemented with fans that are not adjustable to provide increased air flow control capability. In some embodiments, the controller 124 adjusts the cooling shutter 146 to control air flow provided to the air-to-coolant radiator. The controller 124 may be configured to control the shutter 146 in response to one or more operating conditions and/or parameters of the engine that are detected or sensed via one or more sensors of the engine. For example, the controller may be operable to close the cooling shutter when an engine coolant temperature is below a designated threshold value. By closing the cooling shutter during such conditions, overcooling of engine coolant is reduced, thus allowing the engine coolant to heat to a suitable operating temperature more quickly.

Turning back to radiator cooling circuit 134, coolant exiting second sub-cooler 140 is directed to water-based intercooler 136 and coolant-to-oil cooler 137. In some embodiments, water-based intercooler 136 may be removed, while in other embodiments, water-based intercooler 136 may be positioned after coolant-to-oil cooler 137. The water-based intercooler 136 is mounted to the engine and positioned downstream from compressor 114 in the air intake passage defined by the air intake structure 106. The water-based intercooler 136 rejects heat from the combustion air through transfer to coolant flowing through the water-based intercooler 136. Combustion air entering the water-based intercooler 136 flows across a surface of the water-based intercooler 136 causing heat to be transferred from the combustion air to coolant flowing through the water-based intercooler 136. Pressurized combustion air exiting the water-based intercooler 136 flows through an engine manifold of the engine 102 and is delivered to the plurality of cylinders 104 for combustion.

The coolant-to-oil cooler 137 is operable to receive coolant from the water-based intercooler 136 in the radiator coolant cooling circuit 134 (or, in embodiments where the water-based intercooler 136 is removed or positioned after the coolant-to-oil cooler 137, from the second air-to-coolant sub-cooler 140). The coolant-to-oil cooler 137 may be a brazed heat exchanger. The coolant-to-oil cooler 137 receives engine oil that is pumped from an oil pan by an oil pump. Oil circulates through the coolant-to-oil cooler 137 and flows to the engine 102 before returning to the oil pan to form an oil cooling circuit. The coolant-to-oil cooler 137 transfers heat to and from the coolant from and to the engine oil. The coolant-to-oil cooler 137 acts as a moderator in the oil and coolant circuits to drive the oil temperature toward the coolant temperature so that the plurality of cylinders 104 and corresponding pistons inside the engine 102 do not expand into the water jacket 130. Such moderation between coolant temperature and oil temperature may be particularly applicable in engine configurations in which pistons are cooled by oil jets or other application of oil for piston cooling. Coolant flows from the coolant-to-oil cooler 137 to the coolant pump 132 to close the radiator cooling circuit 134.

The dual cooling circuits illustrated in FIG. 1 allow coolant temperature in the engine cooling circuit 129 to be maintained at a relatively higher temperature. The radiator system 135 may be provided in the radiator cooling circuit 134, and thereby may be separated from the engine cooling circuit 129. Therefore, the coolant provided to the engine cooling circuit 129 is only cooled via mixing with coolant from radiator cooling circuit 134 at an inlet of the coolant pump 132. The dual cooling circuits may allow the radiator system to have a decreased size in comparison to single cooling circuit configurations, as the cooling demands on the radiator system may be relatively reduced in the current configuration.

The thermal management system 100 may also include vent lines from various elements of the system to allow air to vent while filling the system and steam to be released while coolant is pumped through the system. As illustrated in FIG. 1, vent line 150 provides venting for engine 102, vent line 152 provides venting for radiator unit 138, and vent line 154 provides venting for water-based intercooler 136. In some embodiments, additional or fewer vent lines may be included for elements of the thermal management system. Vent lines 150, 152, and 154 are routed to expansion tank 156. Expansion tank 156 collects water from the vent lines and routes the collected water to coolant pump 132. In some embodiments, vent line 150 may be larger than vent lines 152 and 154 in order to accommodate the increased steam production in the engine cooling circuit 129 due to a higher coolant temperature in engine cooling circuit 129 as compared to coolant within radiator cooling circuit 134. In some embodiments, vent line 150 may have a diameter that is twice as large as diameters of vent lines 152 and 154. For example, vent line 150 may have a diameter of 1 inch, while vent line 152 may have a diameter of 0.5 inches and vent line 154 may have a diameter of 0.5 inches.

In the illustrated embodiment, the controller 124 is a computing device, such as microcomputer that includes a processor unit, input/output ports, memory, and a data bus. The controller 124 is configured to receive various signals from sensors coupled to the engine 102; the controller may be configured to use one or more of the signals as a basis for thermal control of the engine 102. For example, the controller 124 may receive a manifold air temperature (MAT) signal from an air temperature sensor 148 and an engine coolant inlet temperature from a coolant temperature sensor 158 (that is, the engine coolant inlet temperature may be a temperature of engine coolant measured at the inlet region of the engine water jacket, or otherwise in a region where coolant enters an engine to cool the engine). The controller 124, in addition to those signals previously discussed, may also receive signals from other engine sensors such as engine manifold pressure, boost pressure, engine position, engine speed, engine load, air-fuel ratio, exhaust temperature, ambient temperature, etc. Ambient temperature includes the temperature of the air as it enters the intake and may be substantially equal to the temperature of the air outside of the vehicle or other structure in which the engine is incorporated.

The controller 124 is operable to adjust various actuators in the engine 102 based on different operating parameters received or derived from different sensor signals to control temperatures of the engine 102. For example, the controller 124 provides feedback control of the fan 128, the cooling shutter 146, and/or the air intake door 110 to adjust temperatures of the engine 102.

In some embodiments, the controller 124 is operable to adjust air flow provided by the fan 128 based on an operating parameter, such as manifold air temperature. In some implementations, the controller 124 is operable to adjust air flow provided by the fan 128 based on multiple operating parameters. For example, operation of the fan 128 may be adjusted based on manifold air temperature, ambient temperature, engine gross horsepower, and/or engine coolant temperature. Adjusting air flow provided by the fan may include varying a speed of driven electric motors of the fan or varying a blade pitch of the fan at constant speed of the electric fan motor. In some examples, the controller 124 operates the fan 128 in reverse operation for cleaning of the heat exchangers and intake system of the engine cooling package.

Furthermore, in embodiments, the controller 124 is operable to adjust the cooling shutter 146 to provide thermal control of the engine 102. The controller 124 may adjust the cooling shutter 146 based on one or more operating parameters, such as manifold air temperature, ambient temperature, engine coolant temperature, etc. For example, the controller 124 closes the cooling shutter as long as the manifold air temperature is below a threshold temperature indicative of a designated combustion temperature. The controller 124 may additionally or alternatively close the cooling shutter 146 as long as the engine coolant temperature is below a threshold temperature indicative of an engine temperature that is different from the combustion temperature.

In some implementations, the controller 124 is operable to adjust the air intake door 110 to a first position that provides intake air from the engine compartment to the air intake passage or a second position that provides ambient environment air to the air intake passage based on operating conditions. For example, the controller 124 adjusts the air intake door 110 to the first position when ambient air is below a first threshold temperature and manifold air temperature is below a second threshold temperature to provide warmer air from the engine compartment to heat the combustion air. As another example, the controller 124 adjusts the air intake door 110 to the second position when manifold air temperature is above the second threshold temperature to provide cooler air from the ambient environment for denser intake air charge.

In implementations that include variable compression turbochargers, such as variable geometry turbochargers, the controller 124 is operable to adjust an amount of compression produced by the compressor 114 based on an operating parameter, such as manifold air temperature. For example, the controller 124 adjusts the turbocharger 116 to increase compression to heat combustion air to a designated temperature.

In order to control the cooling fan and associated shutter, the controller 124 may include a regulator 160. The regulator 160 may be configured to control the speed of the fan 128, and control the position of cooling shutter 146 based on manifold air temperature (as determined from sensor 148), ambient temperature, and engine output.

Figure 2:
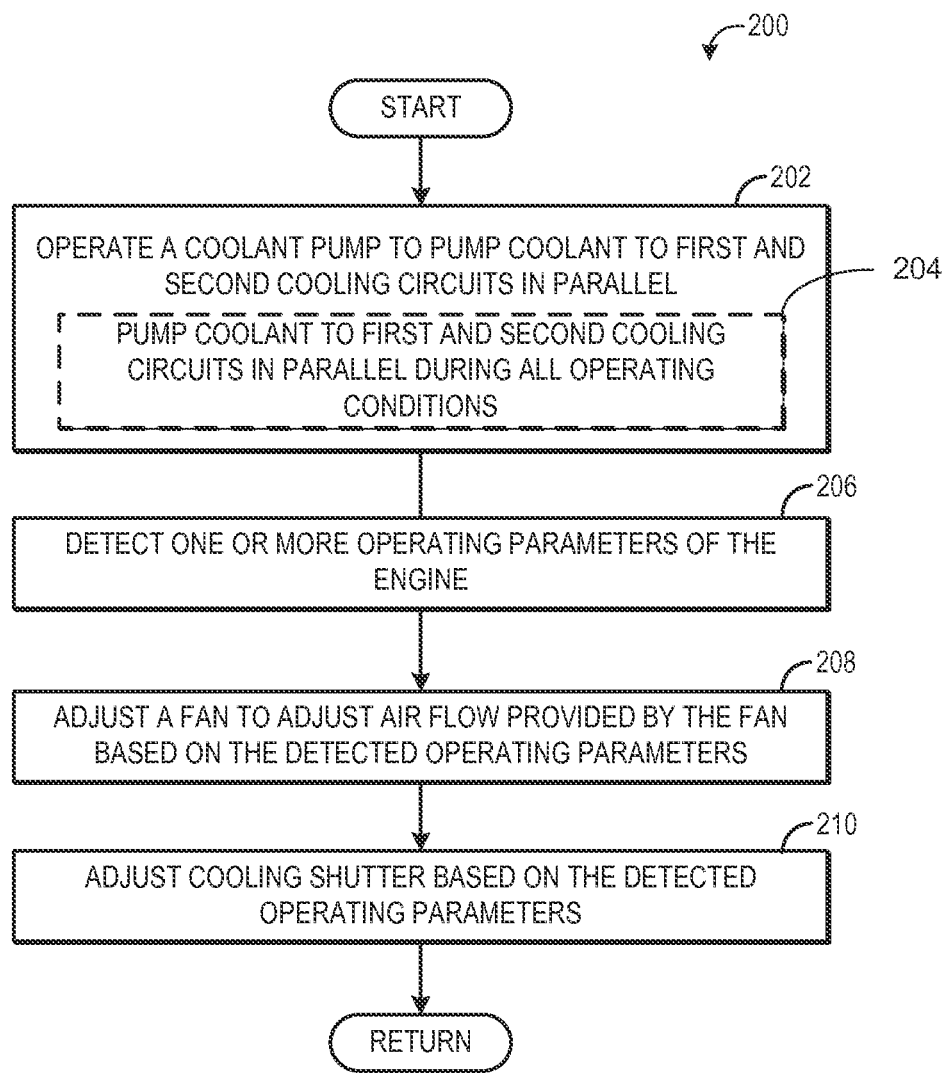
FIG. 2 is a flow chart illustrating a method for cooling coolant within a first and second cooling circuit of a thermal management system according to an embodiment of the present invention.

FIG. 2 is a flow chart illustrating a method 200 for controlling a coolant pump, a fan speed, and a cooling shutter according to an embodiment of the present invention. Method 200 may be carried out by a controller, such as controller 124, according to instructions stored thereon, in order to perform the steps of the method. For example, controller 124 may control the operation of a coolant pump, such as coolant pump 132, the speed of a cooling system fan, such as fan 128, and/or the position of a cooling shutter, such as cooling shutter 146. Method 200 provides coolant of varying temperatures to elements of a thermal management system of an engine, such as thermal management system 100 of FIG. 1, to efficiently cool the engine and associated elements.

At 202, method 200 includes operating a coolant pump to pump coolant to first and second cooling circuits in parallel. For example, coolant may exit a coolant pump and be passively split such that a first portion of the coolant is provided to the first cooling circuit and a second portion of the coolant is provided to the second cooling circuit. In some embodiments, the first and second portions may be substantially equal to one another. For example, coolant may enter the first and second cooling circuits at equal pressures and/or an equal amount of coolant may enter the first and second cooling circuits simultaneously. At 204, coolant may be pumped to the first and second cooling circuits in parallel during all operating conditions. As used herein, the term "all operating conditions" may refer to all operating conditions of an engine and/or all operating conditions in which a coolant pump is being operated. For example, at 204, coolant may be pumped to the first and second cooling circuits during all operating conditions that include operation of the coolant pump to pump coolant.

At 206, one or more operating parameters of the engine are detected. Operating parameters may include one or more engine operating parameters, such as ambient temperature, engine output (e.g., gross horsepower, horsepower, load, torque), engine temperature, such as MAT or engine coolant inlet temperature, and other parameters. The engine operating parameters may be determined by measuring the parameter in question (e.g., a measured engine temperature may be obtained, such as with sensors operably coupled with the engine system), receiving data/information of the parameter (e.g., from another system), or the like. Designated engine temperature may also be determined based on one or more regulations, current operating conditions, and/or operating parameters. At 208, air flow provided by a fan is adjusted based on the detected operating parameters. Air flow provided by a fan may be adjusted in any suitable manner, such as by controlling a speed of the fan and/or adjusting the pitch of blades of the fan. Adjusting the fan speed may also include setting a rate of change of the fan speed. For example, the fan speed may be adjusted gradually. The fan speed may be adjusted based on the output fan command signal.

At 210, a cooling shutter may be adjusted based on the detected operating parameters. In some embodiments, a cooling shutter may be opened or closed based on one or more operating parameters, such as ambient temperature, engine output (e.g., gross horsepower, horsepower, load, torque), engine temperature, such as MAT or engine coolant inlet temperature, and other parameters. For example, the cooling shutter may be controlled to maintain a coolant temperature above a minimum temperature threshold value based at least in part on one or more sensed ambient conditions, such as ambient environment temperature. Accordingly, the controller may be configured to control the shutter based at least in part on one or more sensed ambient conditions in response to a sensed coolant temperature relative to a minimum temperature threshold value. The cooling shutter may be adjusted to any suitable position, such as fully closed, fully opened, and/or one of a plurality of positions in which the shutter is partially opened. Method 200 then returns.

Thus, method 200 of FIG. 2 provides for operating a coolant pump and adjusting a cooling system fan and cooling shutter based on engine temperature, ambient temperature, and engine output. By pumping through two different cooling circuits, a temperature of coolant provided to different elements of a thermal management system may be controlled more efficiently than single circuit approaches. Further, a temperature of coolant provided to an engine may be maintained at a higher temperature in comparison to systems that directly cool engine coolant with a radiator system.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention may include other examples that occur to those of ordinary skill in the art. Such other examples are intended to be within the scope of the invention if they have structural elements that do not differ from the literal language of the embodiments, or if they include equivalent structural elements with insubstantial differences from the literal languages of the embodiments.

What is claimed is:

1. A thermal management system, comprising:
  a first cooling circuit including an air-to-coolant radiator system;
  a second cooling circuit including an engine coolant jacket, the engine coolant jacket surrounding a plurality of cylinders of an engine;
  a coolant pump configured to provide coolant to the first cooling circuit and the second cooling circuit in parallel, wherein the air-to-coolant radiator system of the first cooling circuit is configured to cool coolant from the coolant pump;
  a fan operable to provide air flow to the air-to-coolant radiator system;
  a cooling shutter, positioned on another side of the air-to-coolant radiator system and remote from the fan, and being adjustable to control the air flow through the air-to-coolant radiator system, where coolant is pumped from the coolant pump through the first coolant circuit without first passing through one or more elements of the second cooling circuit; and
  a passive orifice flow restrictor, positioned between an outlet of the coolant pump and an inlet of the air-to-coolant radiator system, to control a flow of coolant to the air-to-coolant radiator system.

2. The thermal management system of claim 1, wherein coolant is pumped from the coolant pump through the second cooling circuit without first passing through one or more elements of the first cooling circuit, and wherein the air-to-coolant radiator system includes a first sub-cooler, a second sub-cooler, and a radiator positioned within an air flow path of the air flow provided by the fan when the fan is operable, the air flow path passing through the second sub-cooler to the first sub-cooler and through the first sub-cooler to the radiator.

3. The thermal management system of claim 2, further comprising a split passageway attached to an outlet of the radiator and configured to split coolant exiting the radiator into a first portion of coolant provided to the coolant pump and a second portion of coolant provided to the first sub-cooler.

4. A thermal management system comprising:
  a first cooling circuit including an air-to-coolant radiator system;
  a second cooling circuit including an engine coolant jacket, the engine coolant jacket surrounding a plurality of cylinders of an engine;
  a coolant pump configured to provide coolant to the first cooling circuit and the second cooling circuit in parallel, wherein the air-to-coolant radiator system of the first cooling circuit is configured to cool coolant from the coolant pump;
  a fan operable to provide air flow to the air-to-coolant radiator system;
  a cooling shutter, positioned on another side of the air-to-coolant radiator system and remote from the fan, and being adjustable to control the air flow through the air-to-coolant radiator system, where coolant is pumped from the coolant pump through the first coolant circuit without first passing through one or more elements of the second cooling circuit, wherein coolant is pumped from the coolant pump through the second cooling circuit without first passing through one or more elements of the first cooling circuit, and wherein the air-to-coolant radiator system includes a first sub-cooler, a second sub-cooler, and a radiator positioned within an air flow path of the air flow provided by the fan when the fan is operable, the air flow path passing through the second sub-cooler to the first sub-cooler and through the first sub-cooler to the radiator;
  a split passageway attached to an outlet of the radiator and configured to split coolant exiting the radiator into a first portion of coolant provided to the coolant pump and a second portion of coolant provided to the first sub-cooler; and
  further comprising a first passive orifice flow restrictor, positioned between the outlet of the radiator and an inlet of the coolant pump, and a second passive orifice flow restrictor, positioned between an outlet of the engine coolant jacket and the inlet of the coolant pump, to control a flow of coolant to the coolant pump.

5. The thermal management system of claim 3, wherein an output of the second sub-cooler is connected to a water-based intercooler of the engine, for coolant exiting the second sub-cooler to be directed to the water-based intercooler.

6. The thermal management system of claim 5, further comprising a first vent line positioned between the engine and an expansion tank, a second vent line positioned between the water-based intercooler and the expansion tank, and a third vent line positioned between the air-to-coolant radiator system and the expansion tank, the first vent line having a larger diameter than a diameter of the second vent line and having a larger diameter than a diameter of the third vent line.

7. The thermal management system of claim 5, wherein an output of the water-based intercooler of the engine is connected to an oil cooler and an output of the oil cooler is connected to an inlet of the coolant pump, the thermal management system being configured for coolant exiting the water-based intercooler of the engine to be directed to the oil cooler and coolant exiting the oil cooler to be directed to the inlet of the coolant pump.

8. The thermal management system of claim 7, wherein an output of the engine coolant jacket, an output of the oil cooler, and an output of the radiator are each connected to the inlet of the coolant pump, the thermal management system being configured for coolant exiting the engine coolant jacket, coolant exiting the oil cooler, and coolant exiting the radiator to be mixed before entering the inlet of the coolant pump.

9. The thermal management system of claim 1, wherein a diverter section is connected to an output of the coolant pump, the thermal management system being configured for an equal amount of coolant directed through the diverter section to be directed to the first cooling circuit and to the second cooling circuit.

10. The thermal management system of claim 1, further comprising a controller configured to control the shutter based at least in part on one or more sensed ambient conditions in response to a sensed coolant temperature relative to a minimum temperature threshold value.

11. The thermal management system of claim 1, further comprising a controller configured to control the cooling shutter and the fan in response to a sensed intake manifold air temperature.

12. A thermal management method comprising:
pumping coolant from a coolant pump of an engine to two or more cooling circuits in parallel, one of the cooling circuits including an air-to-coolant radiator system and another of the cooling circuits including an engine coolant jacket surrounding a plurality of cylinders of the engine, the coolant pumped from the coolant pump to the air-to-coolant radiator system controlled via a passive orifice flow restrictor, positioned between an outlet of the coolant pump and an inlet of the air-to-coolant radiator system, and without passing through the engine coolant jacket;
detecting one or more operating parameters of the engine;
adjusting a fan to adjust air flow provided by the fan to the air-to-coolant radiator system, the air flow being adjusted based on one or more detected operating parameters; and
adjusting a cooling shutter to adjust air flow provided to the air-to-coolant radiator system based on one or more detected operating parameters.

13. The thermal management method of claim 12, wherein detecting one or more operating parameters of the engine further comprises detecting an engine coolant temperature.

14. The thermal management method of claim 12, wherein detecting one or more operating parameters further comprises detecting an intake manifold air temperature.

15. The thermal management method of claim 12, further comprising pumping coolant to the two or more cooling circuits in parallel under all operating conditions that include operating the coolant pump.

16. A thermal management system, comprising:
a coolant pump configured to provide coolant to a first cooling circuit by directing coolant from an outlet of the coolant pump to an air-to-coolant radiator system, to a water-based intercooler, to an oil cooler, and then to an inlet of the coolant pump, the coolant pump further configured to provide coolant to a second cooling circuit by directing coolant from the outlet of the coolant pump to an engine coolant jacket surrounding a plurality of cylinders of an engine and then to the inlet of the coolant pump without passing through the air-to-coolant radiator system;
a fan operable to provide air flow to the air-to-coolant radiator system;
a cooling shutter, positioned on an opposite side of the air-to-coolant radiator system from the fan, adjustable to control the air flow through the air-to-coolant radiator system; and
a passive orifice flow restrictor, positioned between the outlet of the coolant pump and an inlet of the air-to-coolant radiator system, to control a flow of coolant to the air-to-coolant radiator system.

17. The thermal management system of claim 16, further comprising a first orifice flow restrictor, positioned between an outlet of a radiator of the air-to-coolant radiator system and the inlet of the coolant pump, and a second orifice flow restrictor, positioned between an outlet of the engine coolant jacket and the inlet of the coolant pump, to control a flow of coolant to the coolant pump.

18. The thermal management system of claim 16, wherein coolant exiting the coolant pump flows through a diverter section that passively splits the coolant to direct a first portion of the coolant to the first cooling circuit and a second portion of the coolant to the second cooling circuit.

19. The thermal management system of claim 18, wherein the first portion includes an equal amount of coolant to the second portion, and wherein coolant provided to the second coolant circuit is only cooled via mixing with coolant from the first coolant circuit at the inlet of the cooling pump.

20. A vehicle, comprising the thermal management system of claim 1.

* * * * *